US011646910B2

(12) United States Patent
Ishikawa

(10) Patent No.: US 11,646,910 B2
(45) Date of Patent: May 9, 2023

(54) INFORMATION PROCESSING APPARATUS CAPABLE OF EASILY CONFIGURING SETTING ON INFRASTRUCTURE TO BE USED AND NOTIFYING ERRORS ACCORDING TO THE SETTING ON INFRASTRUCTURE, CONTROL METHOD THEREFOR, AND STORAGE MEDIUM

(71) Applicant: CANON KABUSHIKI KAISHA, Tokyo (JP)

(72) Inventor: Akira Ishikawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 209 days.

(21) Appl. No.: 16/930,704

(22) Filed: Jul. 16, 2020

(65) Prior Publication Data
US 2020/0351122 A1    Nov. 5, 2020

Related U.S. Application Data

(62) Division of application No. 16/032,205, filed on Jul. 11, 2018, now abandoned.

(30) Foreign Application Priority Data

Jul. 14, 2017 (JP) .............................. JP2017-137594

(51) Int. Cl.
*H04L 12/54* (2022.01)
*H04L 69/18* (2022.01)
(Continued)

(52) U.S. Cl.
CPC ........ *H04L 12/5692* (2013.01); *G06F 3/1231* (2013.01); *H04L 41/22* (2013.01);
(Continued)

(58) Field of Classification Search
CPC .... H04L 69/18; H04L 12/5692; H04W 88/06; H04W 36/14; H04N 1/00037; G06F 3/121
See application file for complete search history.

(56) References Cited

U.S. PATENT DOCUMENTS 7,676,798 B2    3/2010  Snover
8,379,537 B2    2/2013  Matsuda
(Continued)

FOREIGN PATENT DOCUMENTS

CN        1578306 A      2/2005
CN      104053193 A      9/2014
(Continued)

OTHER PUBLICATIONS

Office Action issued in Chinese Appln. No. 201810757567.1 dated Jul. 5, 2021. English translation provided.
(Continued)

*Primary Examiner* — Jonathan A Bui
*Assistant Examiner* — Kidest Mendaye
(74) *Attorney, Agent, or Firm* — Rossi, Kimms & McDowell LLP

(57) ABSTRACT

An information processing apparatus in which a user is able to intuitively configure setting on an interface to be used. An interface to be enabled in the information processing apparatus is set in accordance with an instruction by a user. Statuses of a wired interface and a wireless interface are sets as any one of followings: enabling the wired interface without enabling a wireless interface, enabling the wireless interface without enabling the wired interface, and enabling both the wired interface and the wireless interface is set. An error corresponding to the setting is notified.

9 Claims, 14 Drawing Sheets

(51) Int. Cl.
  *H04L 41/22* (2022.01)
  *G06F 3/12* (2006.01)
  *H04N 1/00* (2006.01)
  *H04W 36/14* (2009.01)
  *H04W 88/06* (2009.01)

(52) U.S. Cl.
  CPC ......... *H04L 69/18* (2013.01); *H04N 1/00037* (2013.01); *H04W 36/14* (2013.01); *H04W 88/06* (2013.01); *G06F 3/121* (2013.01)

(56) References Cited

U.S. PATENT DOCUMENTS

| | | | |
|---|---|---|---|
| 8,937,927 | B1 | 1/2015 | Pularikkal |
| 9,241,371 | B2 | 1/2016 | Tanji |
| 9,480,092 | B2 | 10/2016 | Horn |
| 2003/0046397 | A1 | 3/2003 | Trace |
| 2003/0221017 | A1 | 11/2003 | Kim |
| 2004/0266424 | A1* | 12/2004 | Park ............... H04L 12/5692 455/426.1 |
| 2005/0005042 | A1* | 1/2005 | Fukunaga ............ G06F 9/4413 710/62 |
| 2006/0023693 | A1* | 2/2006 | Aso ..................... H04L 41/08 370/351 |
| 2007/0064684 | A1 | 3/2007 | Kottilingal |
| 2007/0239860 | A1* | 10/2007 | Shirai ............. H04L 29/12264 709/224 |
| 2008/0040489 | A1* | 2/2008 | Hockett ............. H04L 69/162 709/228 |
| 2010/0138546 | A1 | 6/2010 | Dubs |
| 2011/0153815 | A1 | 6/2011 | Aoki |
| 2012/0131197 | A1 | 5/2012 | Prentice |
| 2014/0085666 | A1 | 3/2014 | Park |
| 2014/0115393 | A1* | 4/2014 | Kuwahara ........... G06F 11/273 714/27 |
| 2014/0269507 | A1 | 9/2014 | Tanji |
| 2015/0109631 | A1* | 4/2015 | Hayano ............ H04N 1/00307 358/1.13 |
| 2015/0195161 | A1* | 7/2015 | Tanji ................. H04L 61/2046 709/224 |
| 2015/0341516 | A1* | 11/2015 | Hikichi ............. H04N 1/00474 358/1.14 |
| 2016/0253135 | A1 | 9/2016 | Kubota |
| 2016/0313953 | A1* | 10/2016 | Ooba ................ H04N 1/00127 |
| 2018/0349076 | A1 | 12/2018 | Hayashi |
| 2019/0021035 | A1 | 1/2019 | Ishikawa |

FOREIGN PATENT DOCUMENTS

| | | |
|---|---|---|
| CN | 205281471 U | 6/2016 |
| CN | 205354003 U | 6/2016 |
| JP | 2003319461 A | 11/2003 |
| JP | 2004120213 A | 4/2004 |
| JP | 2005130293 A | 5/2005 |
| JP | 2012029139 A | 2/2012 |
| JP | 2015102946 A | 6/2015 |
| JP | 2015130579 A | 7/2015 |
| JP | 2017074724 A | 4/2017 |
| JP | 2017108384 A | 6/2017 |
| KR | 1020050001056 A | 1/2005 |
| RU | 2005115980 A | 1/2006 |
| RU | 2536340 C2 | 12/2014 |

OTHER PUBLICATIONS

Extended European Search Report issued in European Appln. No. 18182838.5 dated Nov. 22, 2018.
Extended European Search Report issued in European Appln. No. 18183333.6 dated Nov. 28, 2018.
"Eth0interfering with wlan0. pi networking" StackExchange. Unix & Linux. Retrieved Nov. 20, 2018. https://unix.stackexchange.com/questions/296498/eth0θ-interfering-with-wlan0-pi-networking.
Office Action issued in Russian Appln. No. 2018125459 dated May 13, 2019. English translation provided.
Office Action issued in U.S. Appl. No. 16/032,234 dated Jul. 16, 2019.
Office Action issued in Russian Appln. No. 2018125454 dated Aug. 28, 2019. English translation provided.
Office Action issued in European Appln. No. 18183333.6 dated Oct. 7, 2019.
Office Action issued in U.S. Appl. No. 16/032,234 dated Dec. 18, 2019.
Office Action issued in U.S. Appl. No. 16/032,234 dated Apr. 28, 2020.
Office Action issued in U.S. Appl. No. 16/032,205 dated Nov. 6, 2019.
Office Action issued in U.S. Appl. No. 16/032,205 dated May 15, 2020.
Office Action issued in Korean Appln. No. 10-2018-0079746 dated Apr. 8, 2021.
Office Action issued in Indian Appln. No. 201844026042 dated Feb. 13, 2021.
Office Action issued in Japanese Appln. No. 2017-137594 dated May 18, 2021.
Notice of Allowance issued in Korean Appln. No. 10-2018-0079746 dated Jul. 22, 2021.
Notice of Allowance issued in U.S. Appl. No. 16/032,234 dated Aug. 26, 2020.

* cited by examiner

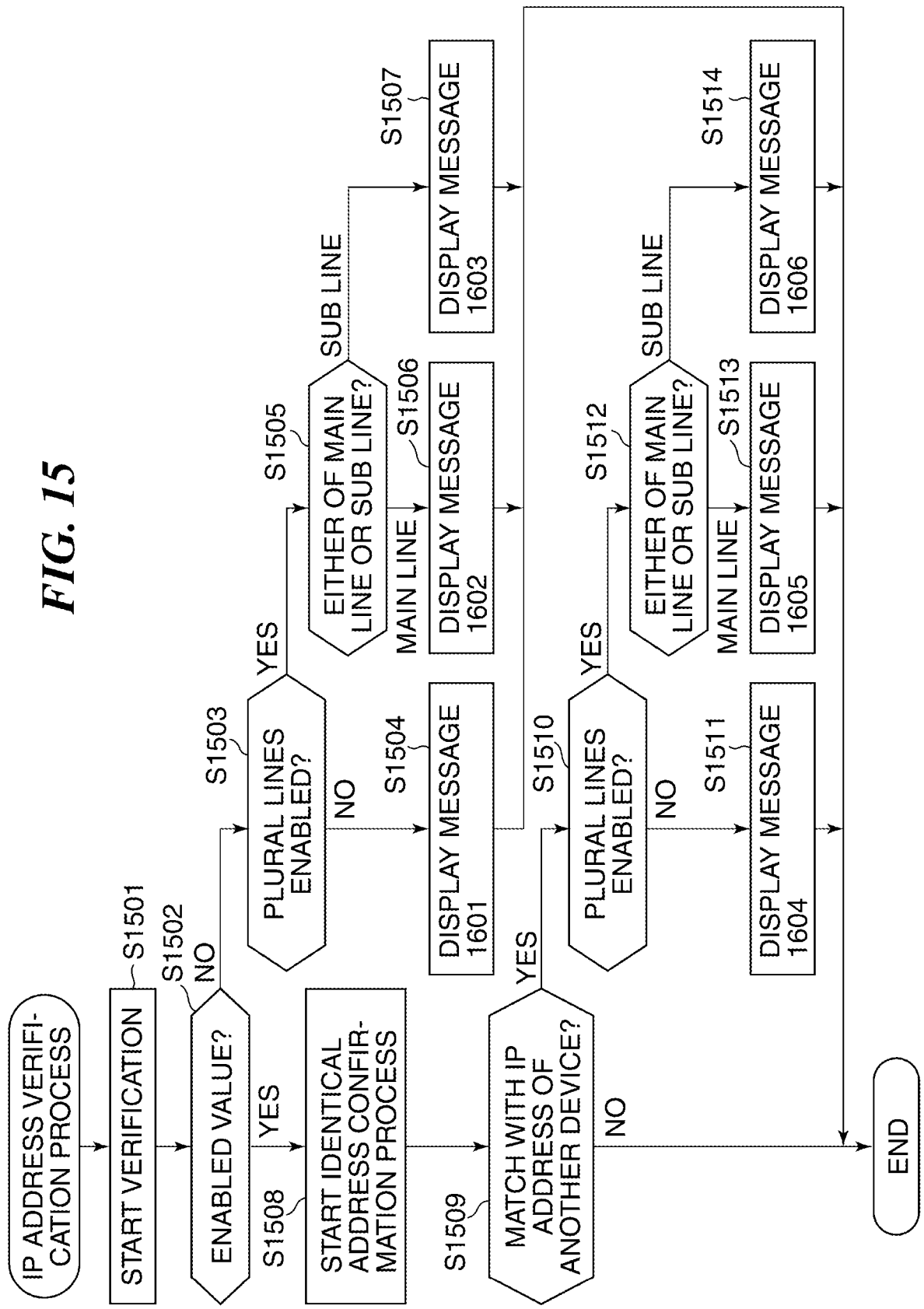

FIG. 16A

| CONDITION | MESSAGE |
|---|---|
| SINGLE LINE MODE | PLEASE CHECK IP ADDRESS ~1601 |
| PLURAL LINE MODE AND MAIN LINE | PLEASE CHECK IP ADDRESS OF MAIN LINE ~1602 |
| PLURAL LINE MODE AND SUB LINE | PLEASE CHECK IP ADDRESS OF SUB LINE ~1603 |

FIG. 16B

| CONDITION | MESSAGE |
|---|---|
| SINGLE LINE MODE | ADDRESSES OVERLAP ON NETWORK ~1604 |
| PLURAL LINE MODE AND MAIN LINE | ADDRESSES OVERLAP ON NETWORK OF MAIN LINE ~1605 |
| PLURAL LINE MODE AND SUB LINE | ADDRESSES OVERLAP ON NETWORK OF SUB LINE ~1606 |

INFORMATION PROCESSING APPARATUS CAPABLE OF EASILY CONFIGURING SETTING ON INFRASTRUCTURE TO BE USED AND NOTIFYING ERRORS ACCORDING TO THE SETTING ON INFRASTRUCTURE, CONTROL METHOD THEREFOR, AND STORAGE MEDIUM

BACKGROUND OF THE INVENTION

Field of the Invention

The present invention relates to an information processing apparatus, a control method therefor, and a storage medium.

Description of the Related Art

Generally, a plurality of LANs (local area networks) is used in different ways in an office, a commercial facility, and so on, according to security and the like required for a network. An information processing apparatus employed in an office and the like needs to offer a service with respect to a plurality of LANs, and thus an information processing apparatus equipped with a plurality of communication interfaces is produced (for example, see, Japanese Laid-Open Patent Publication (Kokai) No. 2003-319461). For example, the information processing apparatus comprises a communication interface for performing wired LAN communication and a communication interface for performing wireless LAN communication in a wireless LAN infrastructure mode.

Whether to use the wired LAN or the wireless LAN infrastructure mode in the information processing apparatus varies depending on a usage of the information processing apparatus and a security policy of an environment where the information processing apparatus is used. Therefore, an administrator of the information processing apparatus needs to configure a setting on which communication interface is to be used among the plurality of communication interfaces of the information processing apparatus, and thus the setting is desired to be configured by an intuitive operation in terms of usability.

SUMMARY OF THE INVENTION

The present invention provides a solution which enables a user to intuitively configure a setting on an infrastructure to be used and is capable of notifying an error corresponding to the setting.

Accordingly, the present invention provides an information processing apparatus comprising a setting unit configured to set an interface to be enabled in the information processing apparatus in accordance with an instruction by a user, and a notification unit configured to notify an error, wherein the setting unit sets statuses of a wired interface and a wireless interface as any one of followings: enabling the wired interface without enabling the wireless interface, enabling the wireless interface without enabling the wired interface, and enabling both the wired interface and the wireless interface, and the notification unit notifies an error corresponding to the setting set by the setting unit.

According to the present invention, the user is able to intuitively configure the setting on the infrastructure to be used, and the error corresponding to the setting is notified.

Further features of the present invention will become apparent from the following description of exemplary embodiments (with reference to the attached drawings).

BRIEF DESCRIPTION OF THE DRAWINGS

FIG. 15 is a flowchart showing a procedure of an IP address verification process in step S1410 in FIG. 14.

FIGS. 16A and 16B are views showing examples of messages displayed on the operating unit appearing in FIG. 1.

DESCRIPTION OF THE EMBODIMENTS

An embodiment of the present invention will now be described with reference to the accompanying drawings. In the present embodiment, a description will be given of a case where the present invention is applied to an MFP as an information processing apparatus, but the present invention may be applied not only to the MFP but to a communication apparatus such as a PC equipped with a plurality of lines.

Figure 1:
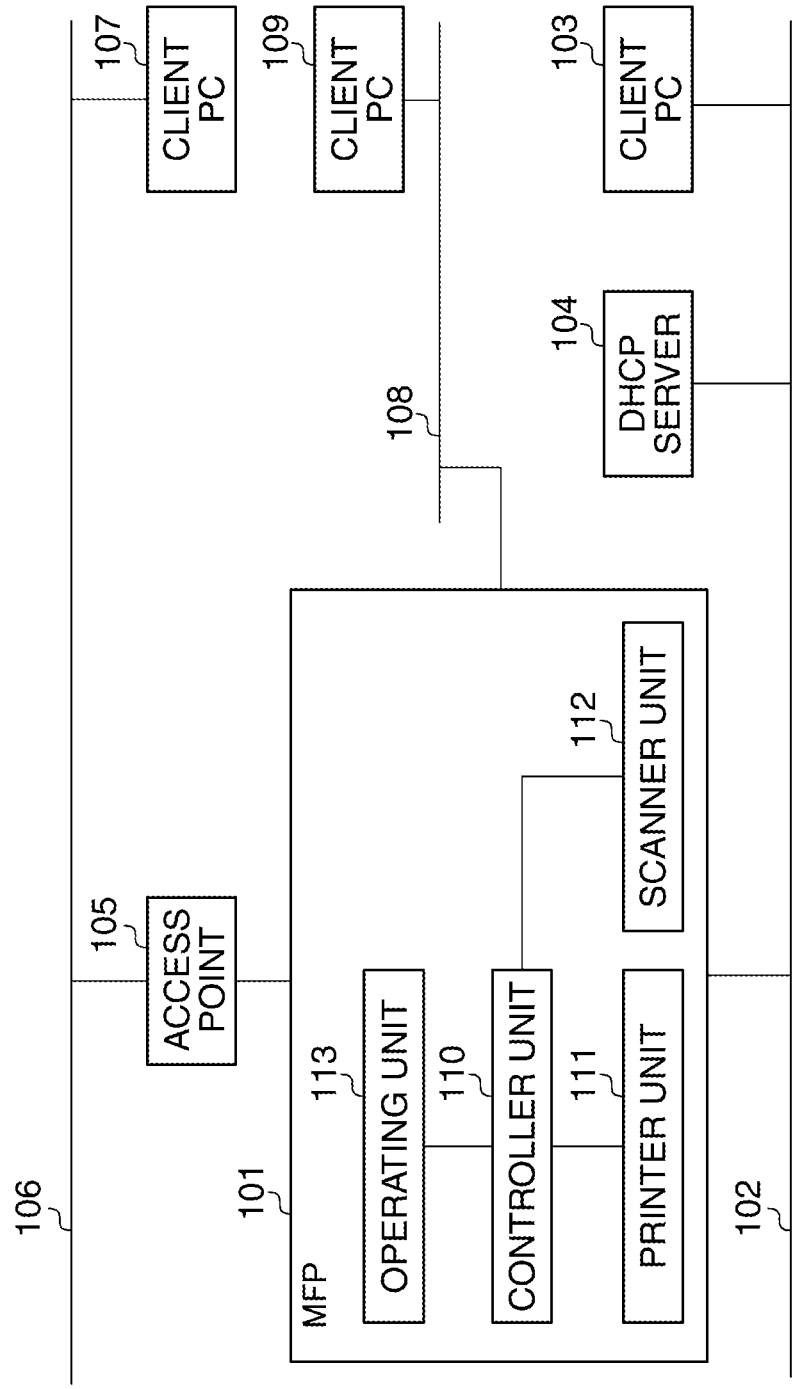
FIG. 1 is a block diagram schematically showing an arrangement of an MFP as an information processing apparatus according to an embodiment of the present invention.

FIG. 1 is a block diagram schematically showing an arrangement of the MFP 101 as an information processing apparatus according to the embodiment of the present invention.

In FIG. 1, the MFP 101 is connected with a client PC 103 and a DHCP (dynamic host configuration protocol) server 104 as communication apparatuses constituting a LAN 102 in a wired infrastructure by a wired cable, not shown. The MFP 101 performs wired LAN communication with the client PC 103 and the DHCP server 104. In the LAN 102, the DHCP server 104 allocates an IP address to each of the MFP 101 and the client PC 103. For example, the client PC 103 designates an IP address of the MFP 101 allocated by the DHCP server 104 to access to the MFP 101 and starts data communication with the MFP 101. The MFP 101 performs wireless LAN communication with a client PC 107 as a communication apparatus constituting a LAN 106 in a wireless infrastructure via an access point 105 communicatively connected to the MFP 101. Further, the MFP 101 itself functions as an access point and directly performs wireless communication with a client PC 109 as a communication apparatus constituting a LAN 108.

The MFP 101 has a plurality of lines, and in the present embodiment, an explanation will be given of an arrangement in which the MFP 101 has one main line and one sub line as an example. The MFP 101 is able to concurrently operate the wired infrastructure and the wireless infrastructure, and in this embodiment, one of the wired infrastructure and the wireless infrastructure is used as the main line, and the other is used as the sub line.

Next, an explanation will be given of the arrangement of the MFP 101. The MFP 101 has a controller unit 110, a printer unit 111, a scanner unit 112, and an operating unit 113, and the controller unit 110 is connected with the printer unit 111, the scanner unit 112, and the operating unit 113.

The controller unit 110 collectively controls overall operation of the MFP 101. The printer unit 111 performs printing on a sheet based on print data received from the communication apparatuses such as the client PCs 103, 107, and 109. The scanner unit 112 scans an original and generates image data. The operating unit 113 has a display unit and a plurality of operation keys, not shown. For example, the operating unit 113 displays an operation screen for configuring settings on the MFP 101 on the display unit and receives an instruction input by a user operating the operation keys.

Figure 2:
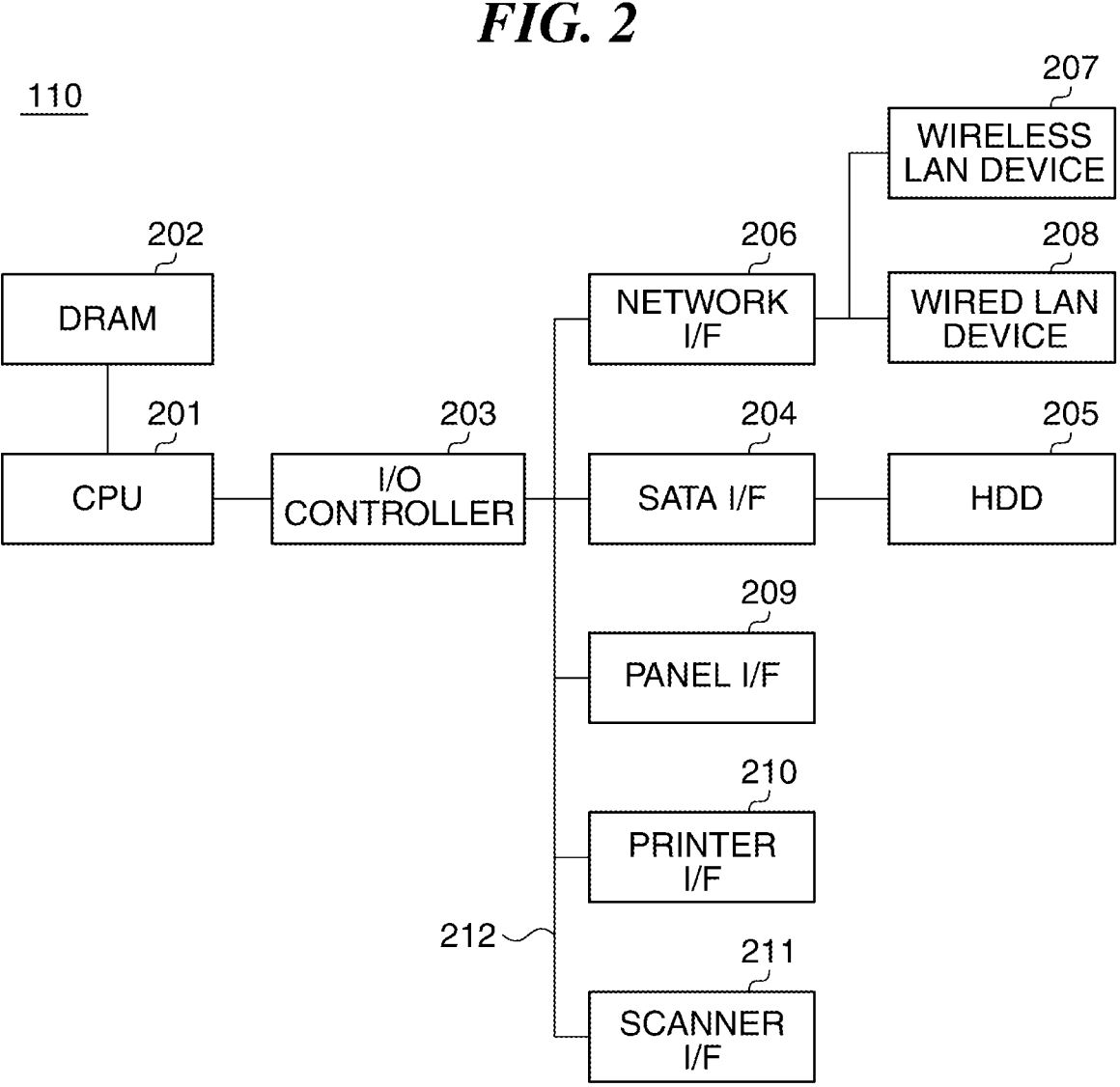
FIG. 2 is a block diagram schematically showing an arrangement of a controller unit appearing in FIG. 1.

FIG. 2 is a block diagram schematically showing an arrangement of the controller unit 110 appearing in FIG. 1.

In FIG. 2, the controller unit 110 has a CPU 201, a DRAM 202, an I/O controller 202, a SATA I/F 204, an HDD 205, a network I/F 206, a wired LAN device 208, and a wireless LAN device 207. The controller unit 110 also has a panel I/F 209, a printer I/F 210, and a scanner I/F 211. The CPU 201 is connected with the DRAM 202 and the I/O controller 203. The I/O controller 203, the SATA I/F 204, the network I/F 206, the panel I/F 209, the printer I/F 210, and the scanner I/F 211 are connected with one another via a bus 212. The SATA I/F 204 is connected with the HDD 205. The network I/F 206 is connected with the wired LAN device 207 and the wireless LAN device 207 which are communication interfaces.

The CPU 201 carries out a computation process for performing various controls in the controller unit 110 and transmits various control instructions to the I/O controller 203. The DRAM 202 is used as a work area for the CPU 201 and as a temporal storage area of various types of data. The I/O controller 203 transfers a control instruction by the CPU 201 to component elements connected via the bus 212. The SATA I/F 204 performs control to write data in the HDD 205 and performs controls to read out data stored in the HDD 205 in accordance with the control instruction by the CPU 201. The HDD 205 stores programs for implementing functions of the MFP 101, image data, and the like.

The network I/F 206 controls each of the wired LAN device 208 and the wireless LAN device 207 in accordance with the control instruction by the CPU 201. The wired LAN device 208 controls wired LAN communication performed with the client PC 103 and the like constituting the LAN 102 in the wired infrastructure. The wireless LAN device 207 has a wireless infrastructure mode and a wireless access point mode. In the wireless infrastructure mode, wireless LAN communication is performed via the client PC 107 and the access point 105 constituting the LAN 106 in the wireless infrastructure. In the wireless access point mode, the MFP 101 functions as an access point and directly performs the wireless communication with the client PC 109 constituting the LAN 108. Hereinafter, the wireless communication in the wireless access point mode is defined as "a Wireless Direct".

The panel I/F 209 performs display control in the operating unit 113 in accordance with the control instruction by the CPU 201 and transfers a content input by the user operating the operating unit 113 to the CPU 201. The printer I/F 210 causes the printer unit 111 to carry out a printing process in accordance with the control instruction by the CPU 201. The scanner I/F 211 causes the scanner unit 112 to carry out a scanning process in accordance with the control instruction by the CPU 201.

Figure 3:
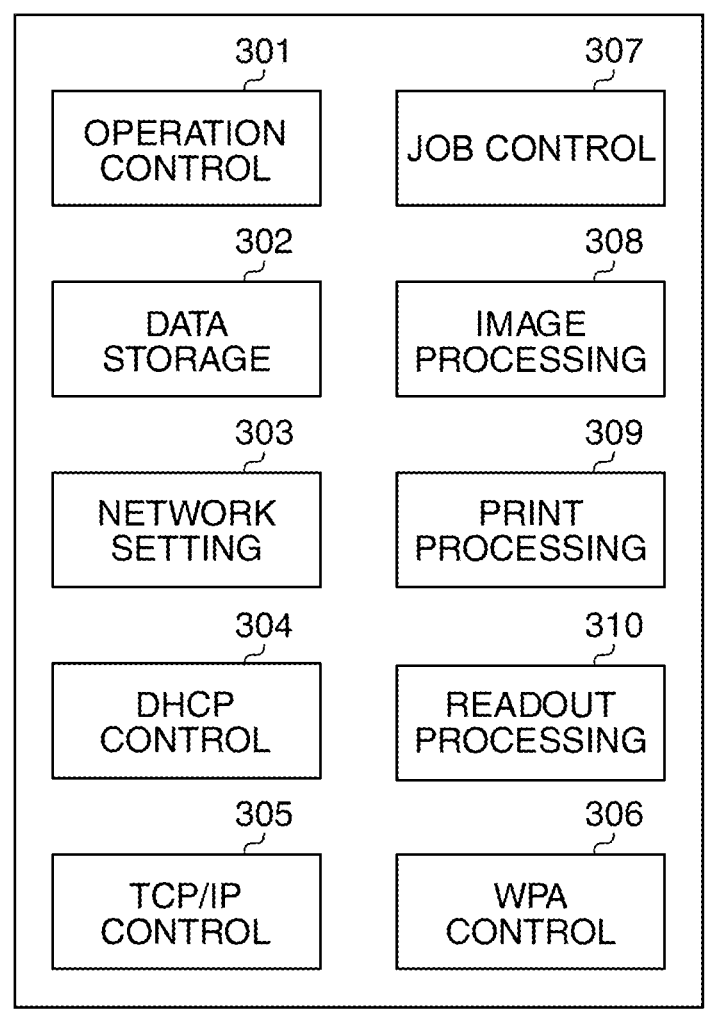
FIG. 3 is a block diagram schematically showing an arrangement of software modules controlled by the controller unit appearing in FIG. 1.

FIG. 3 is a block diagram schematically showing an arrangement of software modules controlled by the controller unit 110 appearing in FIG. 1.

In FIG. 3, the MFP 101 has an operation control module 301, a data storage module 302, a network setting module 303, a DHCP control module 304, and a TCP/IP control module 305. The MFP 101 also has a WPA (Wi-Fi protected access) control module 306, a job control module 307, an image processing module 308, a print processing module 309, and a readout processing module 310. Controls on the above-described modules are performed by the CPU 201 implementing programs stored in the HDD 205.

The operation control module 301 performs display control on the display screen and the like in the operating unit 113 and receives operations by the user on the operation screen and the operation keys. The data storage module 302 performs controls to write data such as a setting value into the HDD 205 and read out data stored in the HDD 205. The network setting module 303 performs control on network settings of the MFP 101 and requests the DHCP control module 304 and the WPA control module 306 and the like to carry out processing. For example, when the user configures a setting to use the IP address allocated by the DHCP server 104 as address information of the MFP 101, the network setting module 303 requests the DHCP control module 304 to carry out the following processing. The DHCP control module 304 controls a process of allocating an IP address in accordance with a protocol defined as a DHCP by RFC 2131. The TCP/IP control module 305 carries out a process of sending/receiving a network packet. When receiving a request from the network setting module 303, the WPA control module 306 carries out a wireless access authentication process in accordance with a predetermined encryption method, for example, a WPA protocol. It should be note that although in the present embodiment, an explanation will be given of a case where a WPA-PSK encryption method is used when the wireless LAN communication is performed, the encryption method is not limited to this. For example, the encryption method may be a WEP, WPA-EAP or the like, and the encryption method may not be used in the wireless LAN communication.

The job control module 307 performs control on execution of a job and issues an execution instruction relating to a job with respect to the image processing module 308, the print processing module 309 and the readout processing module 310. Upon receiving the execution instruction from the job control module 307, the image processing module 308 carries out image processing such as processing of image data into data formats suitable for respective usages. Upon receiving the execution instruction from the job control module 307, the print processing module 309 controls the printer unit 111 to carry out the printing process. Upon receiving the execution instruction from the job control module 307, the readout processing module 310 controls the scanner unit 112 to carry out the scanning process.

Figure 4:
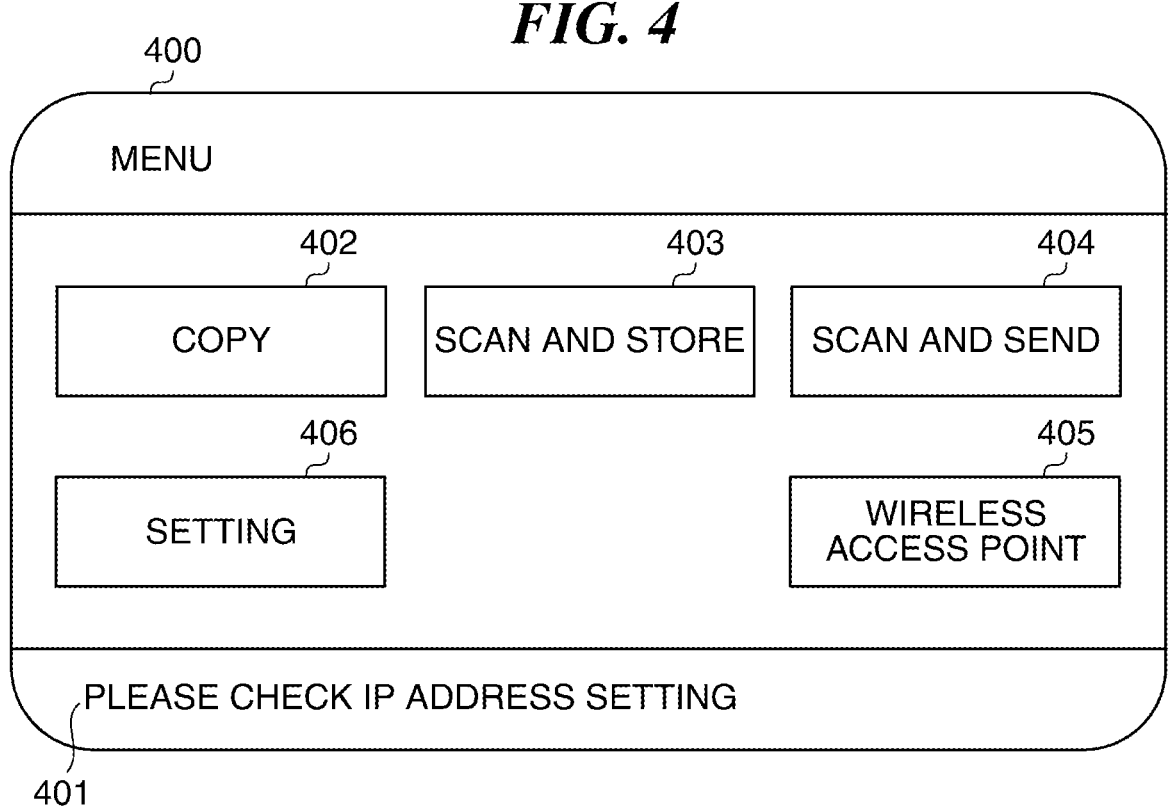
FIG. 4 is a view showing an example of a menu screen displayed on an operating unit appearing in FIG. 1.

Next, an explanation will be given of a menu screen 400 in FIG. 4 displayed on the operating unit 113. The menu screen 400 is an operation screen for the user to select functions of the MFP 101. The menu screen 400 has an information notifying area 401, a copy button 402, a scan and store button 403, a scan and send button 404, a wireless access point button 405, and a setting button 406. In the information notifying area 401, a notification to the user is displayed. The copy button 402 is selected when the user uses the copying function. The scan and store button 403 is selected when the user uses a function to store image data obtained by the MFP 101 performing scanning. The scan and send button 404 is selected when the user uses a function to send the image data obtained by the MFP 101 performing scanning to the communication apparatus. The wireless access point button 405 is selected when the MFP 101 is to sifted into the wireless access point mode. The wireless access point button 405 is displayed on the menu screen 400 when a wireless access point mode enabling setting 1301 in FIG. 13, to be described later, is set to ON. When the user selects the wireless access point button 405, a start setting screen 500 in FIG. 5A, to be described later, is displayed on the operating unit 113. The setting button 406 is selected when the user changes settings on the MFP 101. When the user selects the setting button 406 in the menu screen 400, a setting screen 600 in FIG. 6, to be described later, is displayed on the operating unit 113.

Figure 5A:
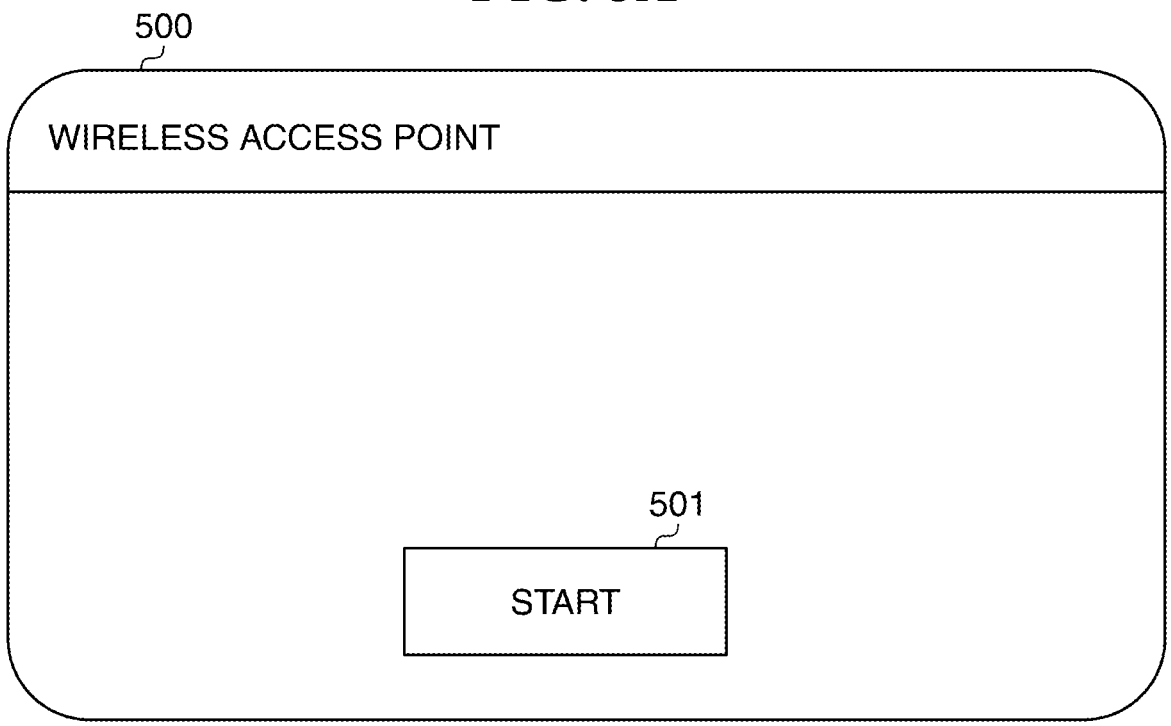
FIGS. 5A and 5B are views showing examples of screens for instructing start and end of a wireless access point mode in the MFP appearing in FIG. 1.

The start setting screen 500 in FIG. 5A is a setting screen for instructing start of the Wireless Direct. When a user selects a start button 501 in the start setting screen 500, an instruction to start shifting to the wireless access point mode is issued to the network setting module 303. As a result, the MFP 101 operates as an access point and becomes ready to start the Wireless Direct with the client PC 109 and the like. Namely, in the present embodiment, the user can instruct to start shifting to the wireless access point mode by an easy operation of merely selecting the wireless access point button 405 in the menu screen 400 and selecting the start button 501 in the start setting screen 500.

Figure 5B:
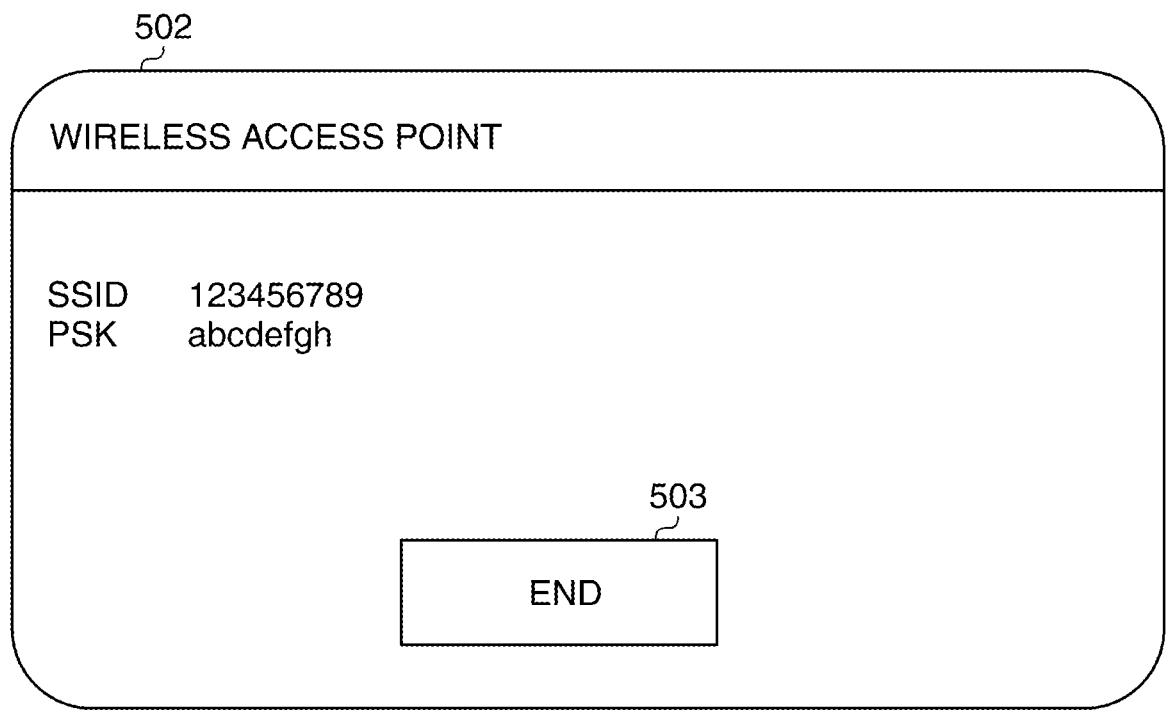

When the user selects the start button 501, a setting information screen 502 in FIG. 5B is displayed on the operating unit 113. In the setting information screen 502, setting information such as an SSID, PSK, or the like required for communicatively connecting the client PC 109 and the like with the MFP 101 as the access point is displayed. When the user selects an end button 503 in the setting information screen 502, an instruction to end the wireless access point mode is issued to the network setting module 303. As a result, the MFP 101 ends the Wireless Direct with the client PC 109.

Figure 6:
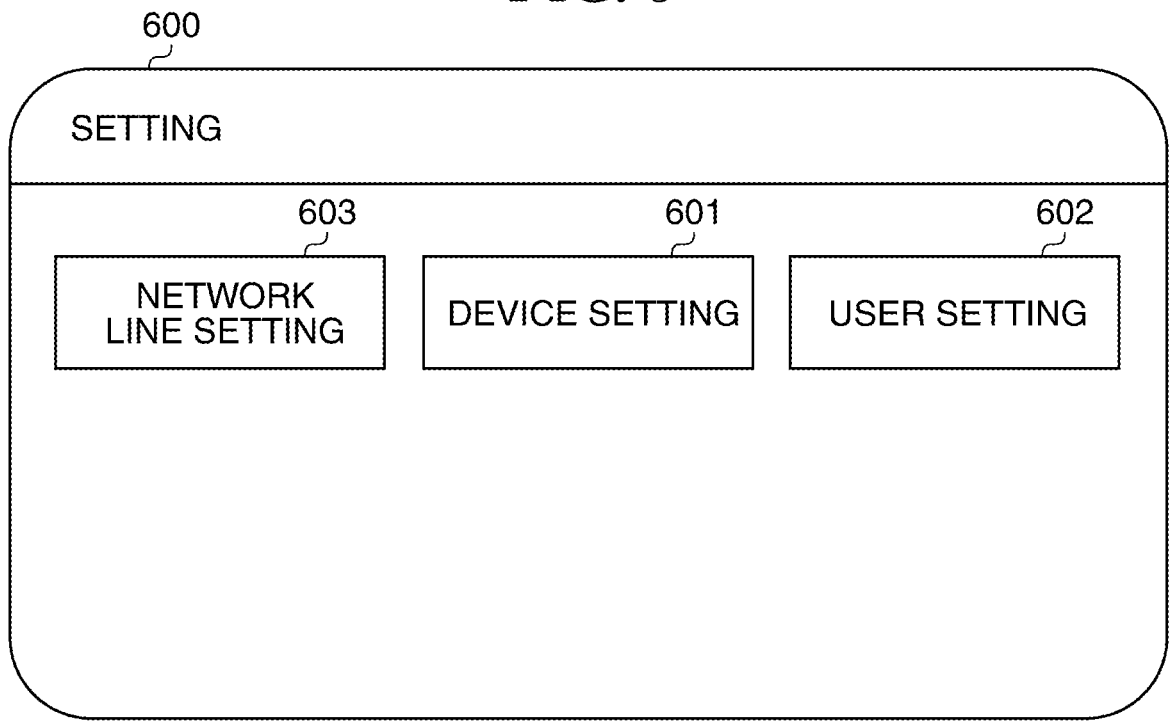
FIG. 6 is a view showing an example of a setting screen displayed on the operating unit appearing in FIG. 1.

The setting screen 600 in FIG. 6 is an operation screen for guiding the user to a setting screen for configuring detailed information of each setting and has a device setting button 601, a user setting button 602, and a network line setting button 603. The device setting button 601 is an operation button for displaying a device setting screen, not shown, for configuring setting on devices of the MFP 101. The user setting button 602 is an operation button for displaying a user setting screen, not shown, for configuring settings on users of the MFP 101. The network line setting button 603 is an operation button for displaying a network setting screen in FIG. 7 for configuring network settings on the MFP 101.

Figure 7:
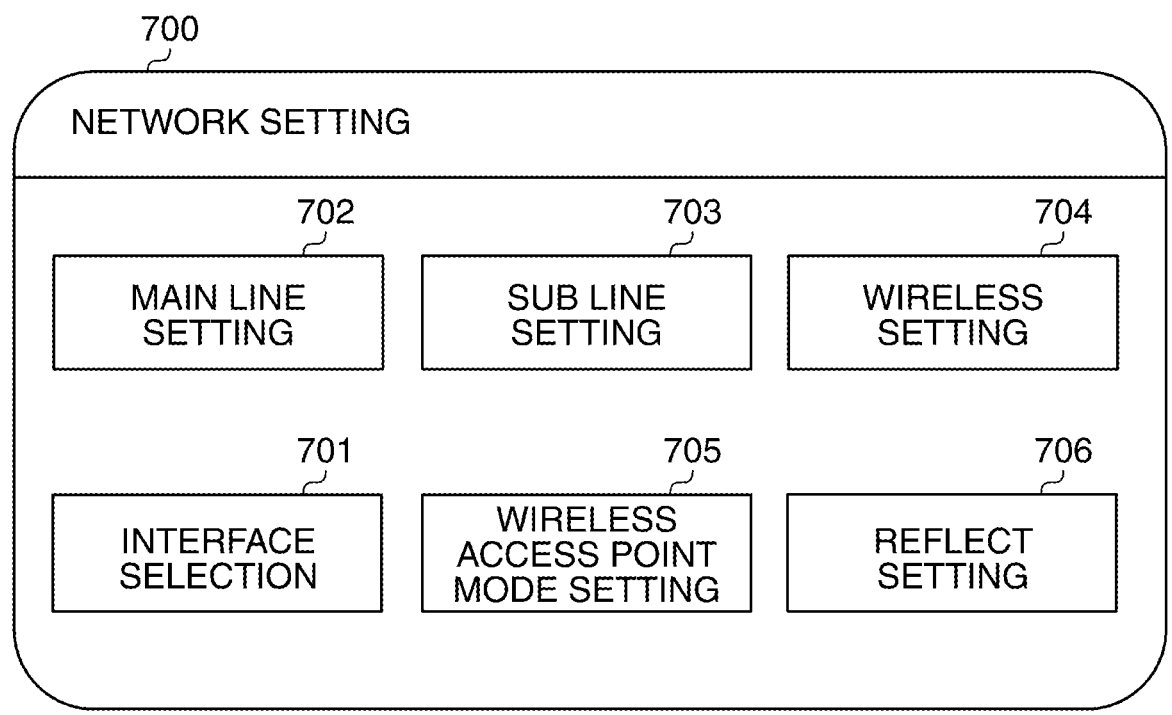
FIG. 7 is a view showing an example of a network setting screen displayed on the operating unit appearing in FIG. 1.

The network setting screen 700 in FIG. 7 is an operation screen for guiding the user to a setting screen for configuring a setting on detailed information of the network settings. The network setting screen 700 has an interface selection button 701, a main line setting button 702, a sub line setting button 703, a wireless setting button 704, a wireless access point setting button 705, and a setting reflection button 706. The interface selection button 701 is an operation button for displaying an interface selection screen 800 in FIG. 8, to be described later. The main line setting button 702 is an operation button for displaying a main line setting screen 900 in FIG. 9, to be described later. The sub line setting button 703 is an operation button for displaying a sub line setting screen 1000 in FIG. 10, to be described later. The wireless setting button 704 is an operation button for displaying a wireless setting screen 1100 in FIG. 11, to be described later. The wireless access point setting button 705 is an operation button for displaying a wireless access point setting screen 1300 in FIG. 13, to be described later. The setting reflection button 706 is an operation button for storing a setting value set by the user in the HDD 205 and instructing reflection of the settings to the network setting module 303.

Figure 8:
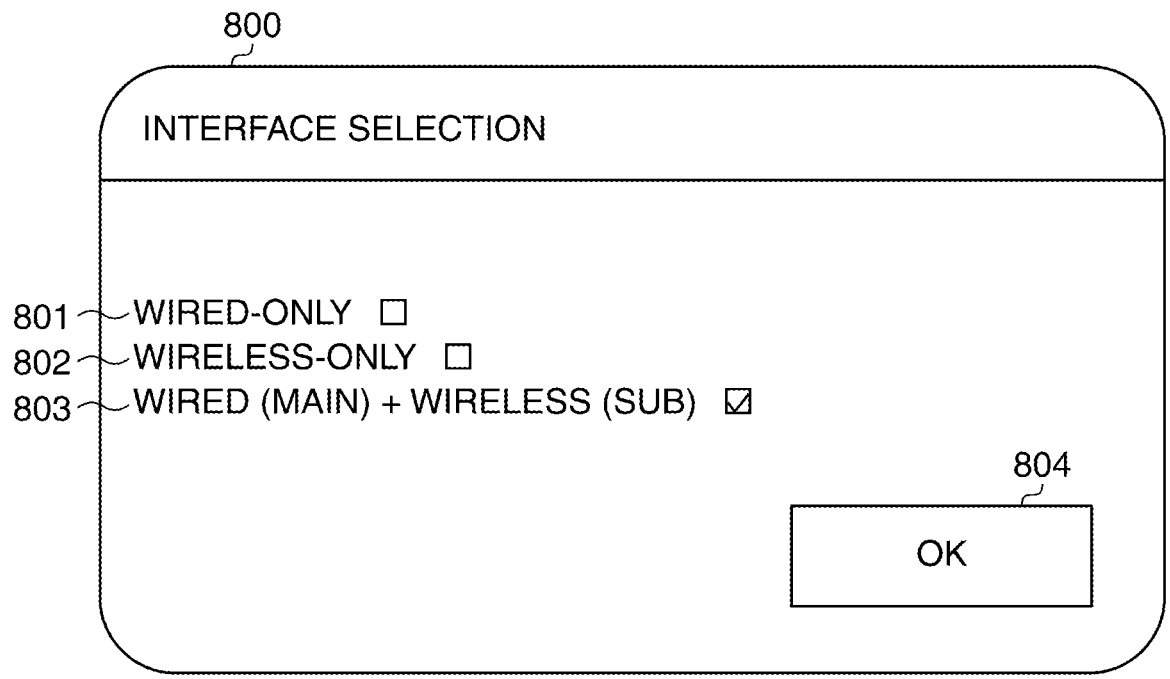
FIG. 8 is a view showing an example of an interface selection screen displayed on the operating unit appearing in FIG. 1.

The interface selection screen 800 in FIG. 8 is a setting screen for configuring a setting on the wired infrastructure and the wireless infrastructure in the MFP 101. Settings in the interface selection screen 800 are configured by an administrator or the like of the MFP 101, and the settings are not changed frequently. The interface selection screen 800 is displayed on the operating unit 113 when a plurality of operations is performed, for example, when the user selects the setting button 406, the network line setting button 603, and the interface selection button 701 in this order. When wired-only 801 is set to ON, the MFP 101 uses the wired infrastructure only. When wireless-only 802 is set to ON, the MFP 101 uses the wireless infrastructure only. When wired (main)+wireless (sub) 803 is set to ON, the MFP 101 uses both the wired infrastructure and the wireless infrastructure. Specifically, the MFP 101 uses the wired infrastructure as a main line and uses the wireless infrastructure as a sub line. In the interface selection screen 800, only one of the wired-only 801, the wireless-only 802, and the wired (main)+wireless (sub) 803 can be set to ON. When an OK button 804 is selected, a setting value set in the interface selection screen 800 is stored in the DD 205. It should be noted that in the present embodiment, the setting on the wireless infrastructure is not associated with the setting on the Wireless Direct, and the setting value set in the interface selection screen 800 does not affects the setting on the Wireless Direct.

Figure 9:
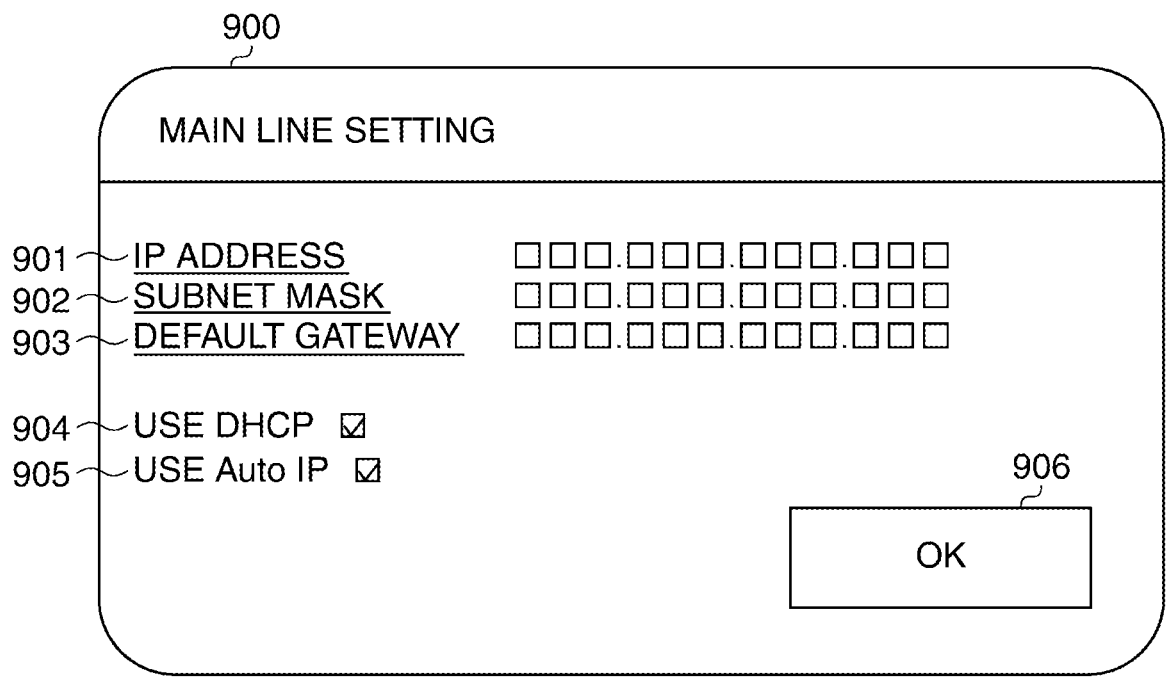
FIG. 9 is a view showing an example of a main line setting screen displayed on the operating unit appearing in FIG. 1.

The main line setting screen 900 in FIG. 9 is an operation screen for setting address information of the main line of the MFP 101. To an IP address input section 901, a subnet mask input section 902, and a default gateway input section 903, the user is able to input an arbitral IP address, subnet mask, and default gateway, respectively. When a DHCP selection section 904 is set ON, a setting to obtain an IP address included in the address information of the main line from the DHCP server on the main line network is configured. When an Auto IP (automatic private IP addressing) selection section 905 is set to ON, a setting to determine an IP address included in the address information of the main line by an Auto IP protocol is configured. When an OK button 906 is selected, the setting values set in the main line setting screen 900 are stored in the HDD 205.

Figure 10:
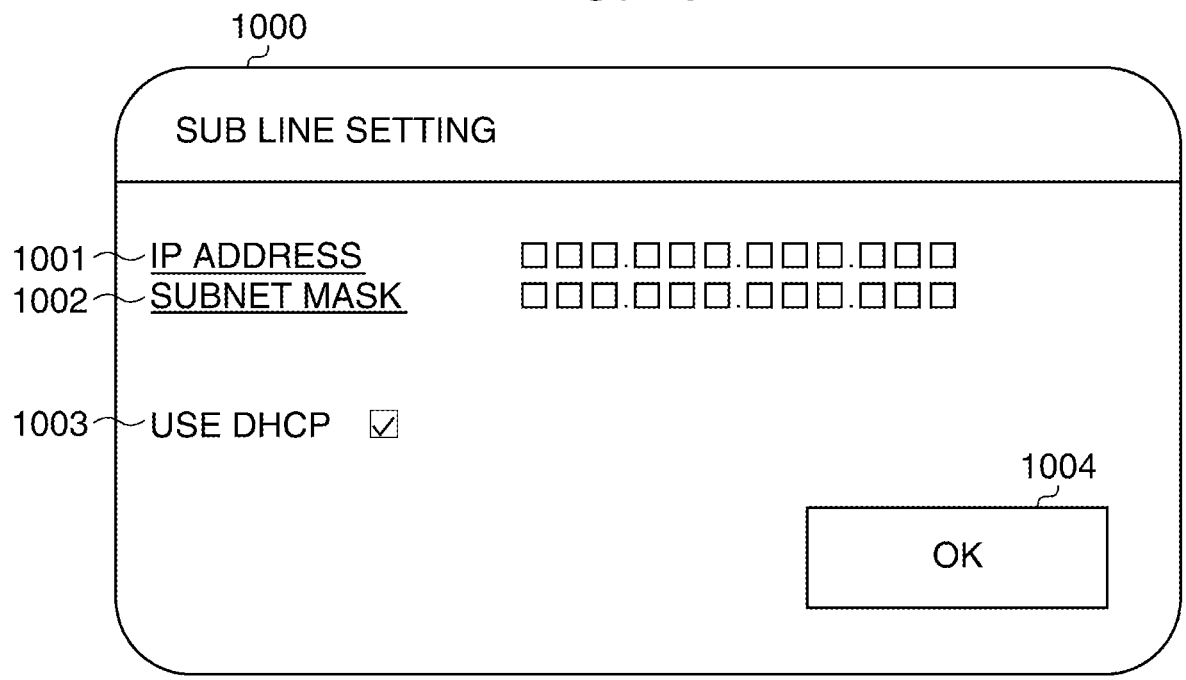
FIG. 10 is a view showing an example of a sub line setting screen displayed on the operating unit appearing in FIG. 1.

The sub line setting screen 1000 in FIG. 10 is an operation screen for setting address information of the sub line of the MFP 101. The user is able to input arbitral IP address and subnet mask in an IP address input section 1001 and a subnet mask input section 1002. When a DHCP selection section 1003 is set to ON, a setting to obtain an IP address included in the address information of the sub line from the DHCP server on the network of the subline is configured. When an OK button 1004 is selected, setting values set in the sub line setting screen 1000 are stored in the HDD 205. It should be noted that in the present embodiment, in order to concurrently use the plurality of lines, a part of functions on the sub line side is limited; for example, the sub line cannot use a default gateway and an Auto IP. For this reason, in the present embodiment, the sub line is used, for example, as a line with which communication is performed within a network set in advance. On the other hand, the main line is used as a line with which communication is performed via a plurality of networks including an external network by using the default gateway other than the network set in advance. The sub line setting screen 1000 does not have a setting item for using the default gateway and the Auto IP. Besides, functions such as DNS, 802.1x, IPsec, IP filter, port filter, MAC address filter, SMB, HTTP, WebDAV, and FTP cannot be used on the subline side.

Figure 11:
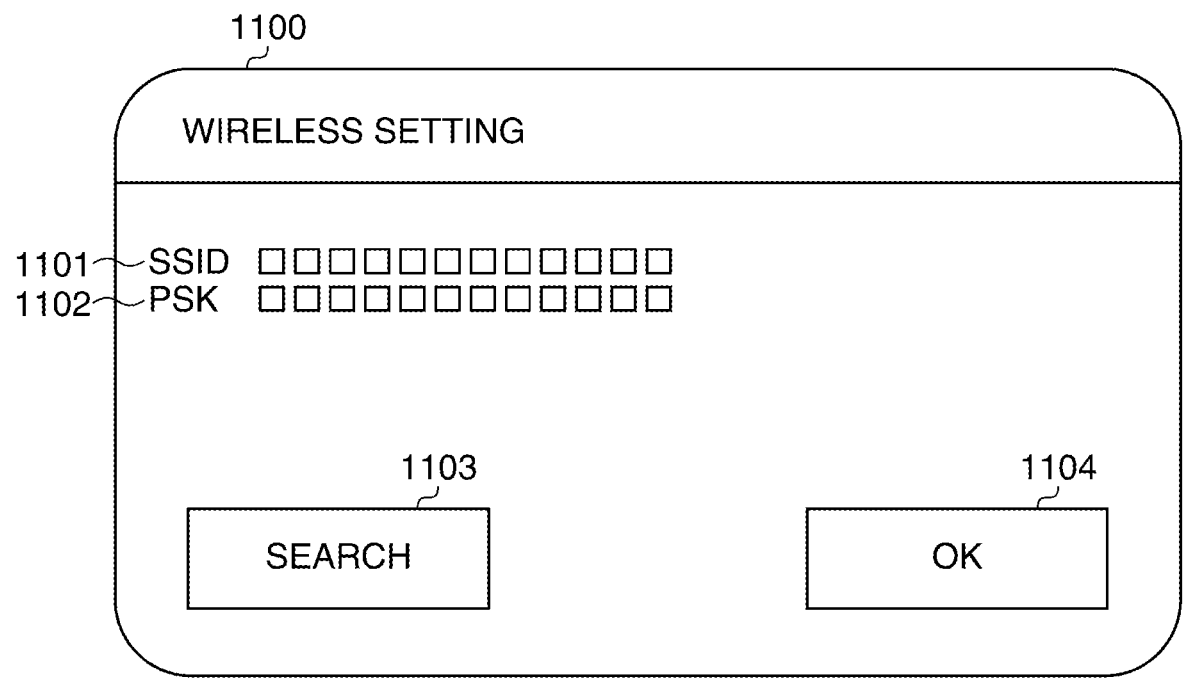
FIG. 11 is a view showing an example of a wireless setting screen displayed on the operating unit appearing in FIG. 1.

The wireless setting screen 1100 in FIG. 11 is an operation screen for configuring a authentication setting in the wireless infrastructure mode. An SSID of an access point to which the user wish to access and a key corresponding to the SSID is input to an SSID input section 1101 and a PSK input section 1102, respectively. When a search button 1103 is selected, an access point selection screen 1200 in FIG. 12 for selecting an access point is displayed on the operating unit 113. When an OK button 1104 is selected, setting values set in the wireless setting screen 1100 are stored in the HDD 205.

Figure 12:
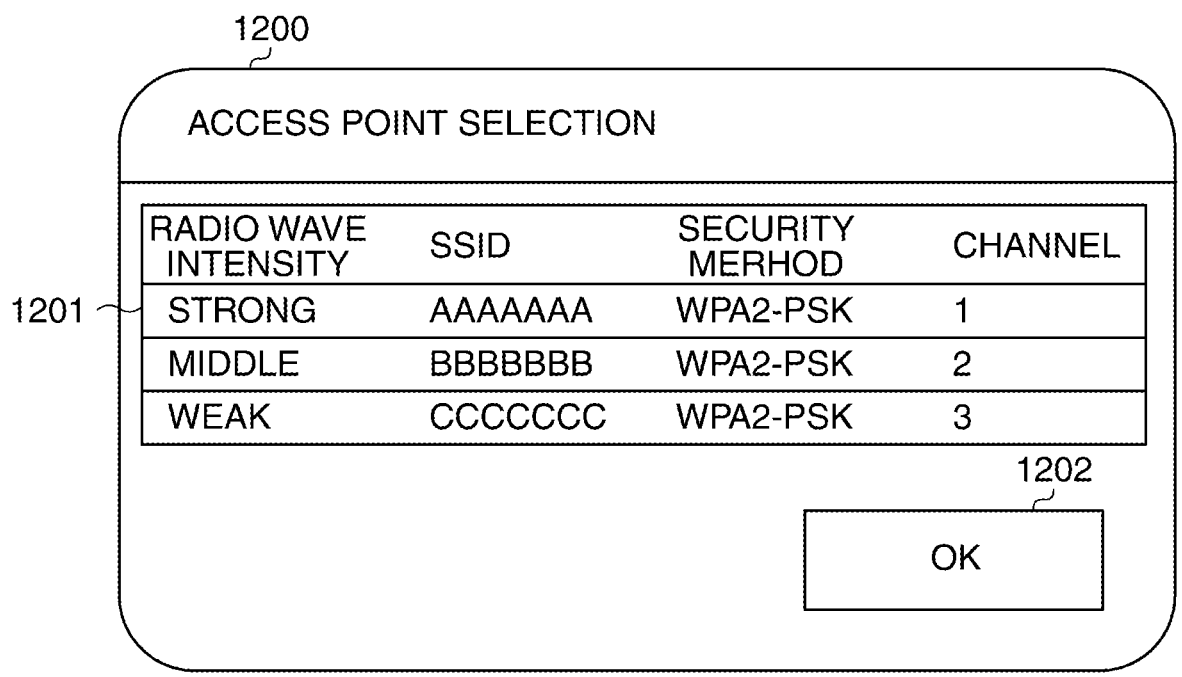
FIG. 12 is a view showing an example of an access point selection screen displayed on the operating unit appearing in FIG. 1.

The access point selection screen 1200 in FIG. 12 is an operation screen for setting an access point to be used by the MFP 101. A list of access points which can be used by the MFP 101 is displayed on a search result display section 1201. When the access point 105, for example, is selected from the list of the access points displayed on the search result display section 1201, and information indicative of the access point 105 is stored in the HDD 205. Thereafter, the wireless setting screen 1100 with the SSID of the access point 105 is set in the SSID input unit 101 is then displayed on the operating unit 113.

Figure 13:
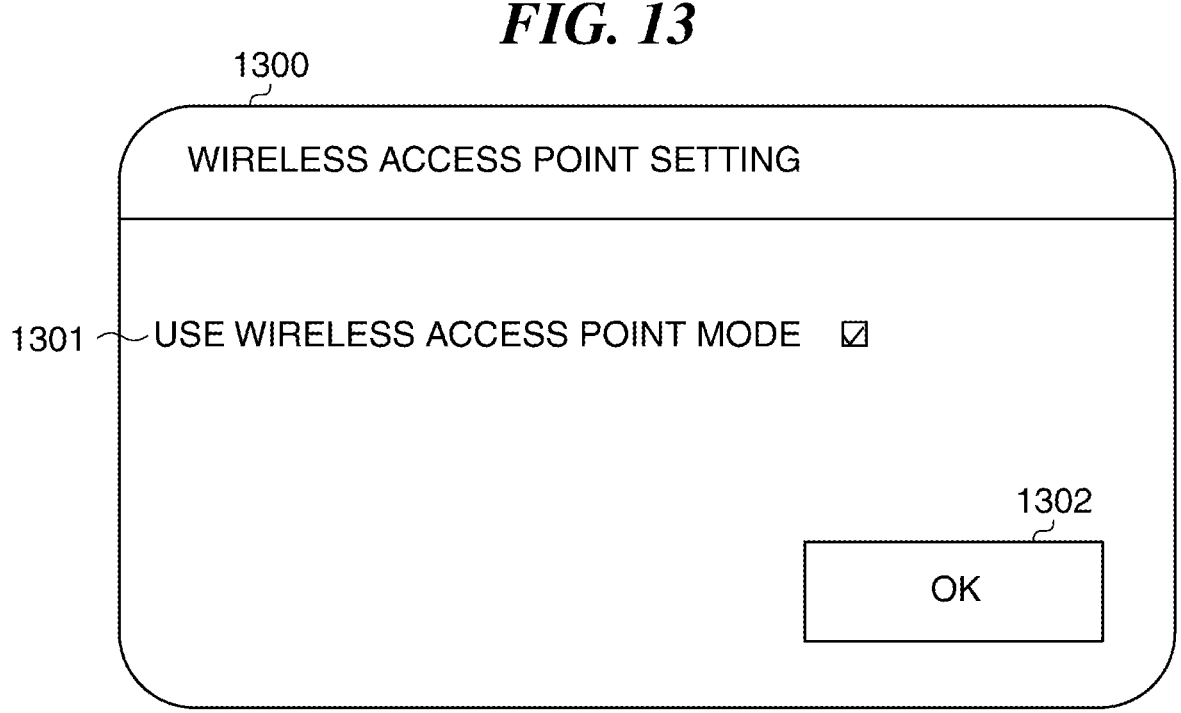
FIG. 13 is a view showing an example of a wireless access point setting screen displayed on the operating unit appearing in FIG. 1.

An wireless access point setting screen 1300 in FIG. 13 is a setting screen for configuring a setting on the wireless access point mode. The settings in the wireless access point setting screen 1300 are also configured by the administrator of the MFP 101 and are not frequently changed. When a wireless access point mode enabling setting 1301 is set to ON, the wireless access point mode of the MFP 101 is enabled. The menu screen 400 displayed on the operating unit 113 with the wireless access point mode enabled includes the wireless access point button 405 for displaying the start setting screen 500 for instructing shifting to the wireless access point mode. On the other hand, when the wireless access point mode enabling setting 1301 is set to OFF, the wireless access point mode of the MFP 101 is disabled. The menu screen 400 displayed on the operating unit 113 with the wireless access point mode disabled does not include the wireless access point button 405. When an OK button 1302 is selected, setting values set in the wireless access point setting screen 1300 are stored in the HDD 205, and a screen on the operating unit 113 is switched to the network setting screen 700.

In the present embodiment described above, the user selects any one of the "wired-only 801", "wireless-only 802", and "wired (main)+wireless (sub) 803" on the interface selection screen 800. Accordingly, the user is able to intuitively configure a setting on an infrastructure to be used.

Moreover, in the present embodiment described above, the main line uses the default gateway, and the sub line does not use the default gateway. Accordingly, the user is able to intuitively configure a setting on an infrastructure to be used under an environment in which the main line which performs communication using a variety of networks constituted by using the default gateway and the sub line which performs communication within a network set in advance only are used properly.

Further, in the present embodiment described above, the interface selection screen 800 is displayed on the operation screen 113 by the user performing a plurality of operations on the MFP 101. The settings in the interface selection screen 800 are to be configured by the administrator of the MFP 101, and it is necessary to manage the MFP 101 so that a general user cannot change the settings easily. On the other hand, it is conceivable that a user authentication is performed to authenticate a user who operates the interface selection screen 800, however, in this case, user information required for the user authentication is necessary to be registered in advance, which takes labor. To solve this problem, in the present embodiment, the interface selection screen 800 is displayed on the operating unit 113 by the user performing the plurality of operations on the MFP 101. As a result, it is possible to manage the MFP 101 so that the general user cannot change the settings in the interface selection screen 800 easily without registering in advance the user information required for the user authentication for operating the interface selection screen 800.

In the present embodiment described above, the interface selection screen 800 includes only the setting items set by the administrator of the MFP 101. This eliminates necessity for the general user to operate the interface selection screen 800, and at least, eliminates a fear that the general user intentionally displays the interface selection screen 800 on the operation screen 113. As a result, an erroneous operation of the general user on the interface selection screen 800 can be prevented.

Next, a description will be given of a process regarding a setting on the address information of the MFP 101.

Figure 14:
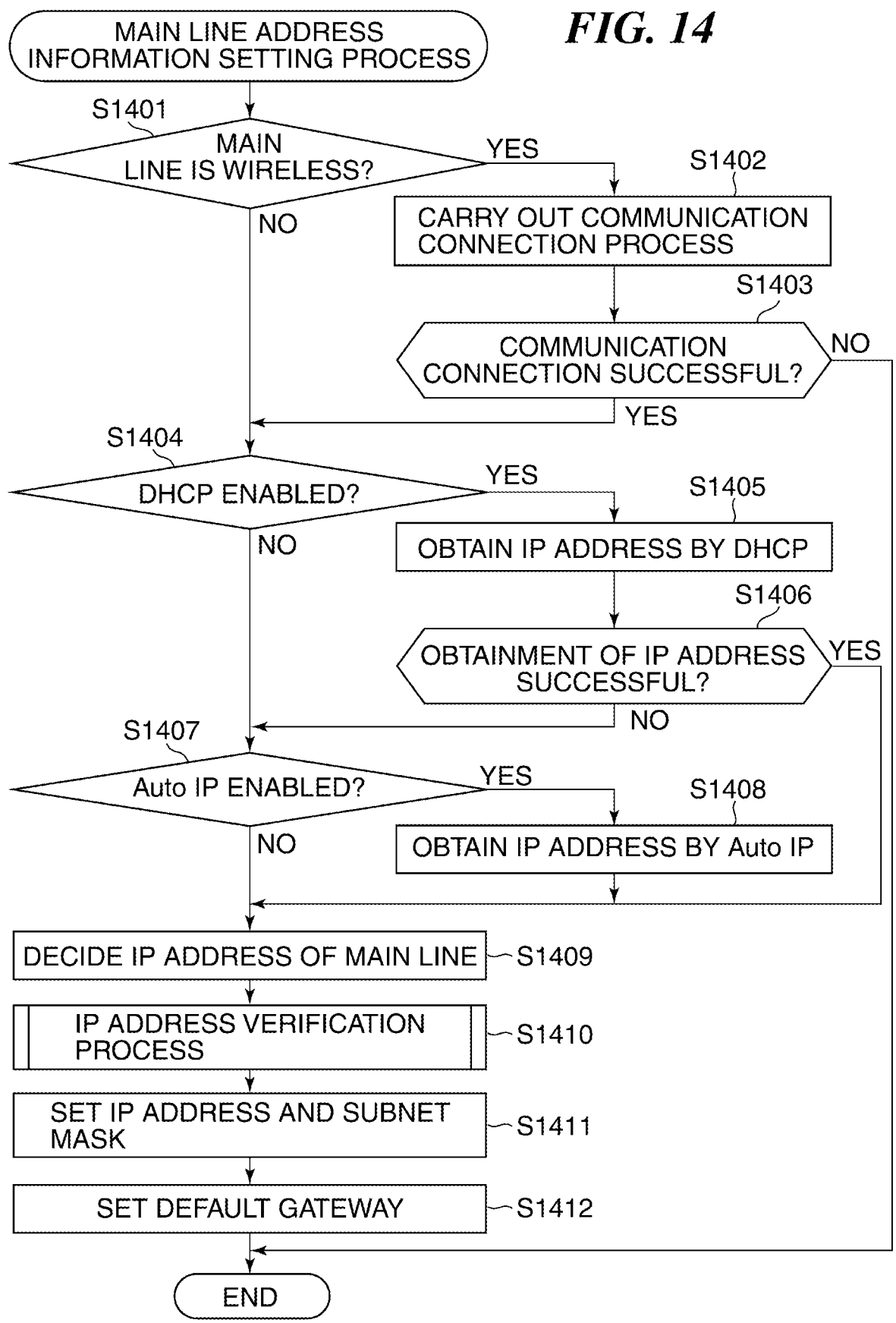
FIG. 14 is a flowchart showing a procedure of a main line address information setting process carried out by a network setting module appearing in FIG. 3.

FIG. 14 is a flowchart showing a procedure of an address information setting process for the main line carried out by the network setting module 303 appearing in FIG. 3.

The process in FIG. 14 is carried out by the CPU 201 implementing a program stored in the HDD 205. The process in FIG. 14 is also carried out when a system of the MFP 101 is started or when the setting reflection button 706 in the network setting screen 700 is selected. Moreover, the process in FIG. 14 is carried out on an assumption that at least the settings on the screens in FIGS. 8, 9 and 11 are already configured.

In FIG. 14, at first, the network setting module 303 determines whether the main line is wireless (step S1401).

In step S1401, when the setting value indicative of the "wireless-only 802" is stored in the HDD 205, the network setting module 303 determines that the main line is wireless. on the other hand, when the setting value indicative of either of the "wired-only 801" or "wired (main)+wireless (sub) 803" is stored in the HDD 205, the network setting module 303 determines that the main line is not wireless.

As a result of determination in step S1401, when the main line is wireless, the network setting module 303 carries out a communication connecting process with an access point set on the wireless setting screen 1100, for example, the access point 105 (step S1402). In the above communication connecting process, the network setting module 303 requests the WPA control module 306 to carry out the process. Accordingly, the WPA control module 306 obtains an SSID and a PSK of the access point 105 from the data storage module 320 and transmits an authentication request generated based on the obtained PSK to the access point 105. The WPA control module 306 receives a determination result as to connection possible/impossible from the access point 105. The network setting module 303 then determines whether the communication connection with the access point 105 was successful (step S1403). In step S1403, when the received determination result indicates connection possible, the network setting module 303 determines that the communication connection with the access point 105 was successful. On the other hand, when the received determination result indicates connection impossible, the network setting module 303 determines that the communication connection with the access point 105 was unsuccessful.

As a result of the determination in step 1403, when the communication connection with the access point 105 was unsuccessful, the network setting module 303 terminates the present process.

When the main line is not wireless as a result of the determination in step S1401 or when the communication connection with the access point 105 was successful as a result of the determination in step S1403, the network setting module 303 determines whether the DHCP is enabled (step S1404). In step S1404, when a setting value indicating that the DHCP selection section 904 is ON is stored in the HDD 205, the network setting module 303 determines that the DHCP is enabled. On the other hand, when a setting value indicating that the DHCP selection section 904 is OFF is stored in the HDD 205, the network setting module 303 determines that the DHCP is disabled.

As a result of the determination in step S1404, when the DHCP is enabled, the network setting module 303 obtains an IP address by the DHCP (step S1405). In step S1405, the network setting module 303 requests the DHCP control module 304 to carry out the process. Accordingly, the DHCP module 304 searches the DHCP server on the network of the main line of the MFP 101 in accordance with the DHCP protocol. The DHCP control module 304 obtains an IP address allocated by the searched DHCP server and registers usage of the obtained IP address to the DHCP server. The network setting module 303 then determines whether the obtainment of the IP address by the DHCP was successful (step S1406).

As a result of the determination in step S1406, when the obtainment of the IP address by the DHCP was successful, the network setting module 303 carries out a process in step S1409, to be described later.

When the DHCP is disabled as a result of the determination is step S1404 or when the obtainment of the IP address by the DHCP was unsuccessful as a result of the determination in step S1406, the network setting module 303 determines whether an Auto IP is enabled (step S1407). In step S1407, when a setting value indicating that the Auto IP selection section 905 is ON is stored in the HDD 205, the network setting module 303 determines that the Auto IP is enabled. On the other hand, when a setting value indicating that the Auto IP selection section 905 is OFF is stored in the HDD 205, the network setting module 303 determines that the Auto IP is disabled.

As a result of the determination in step S1407, when the Auto IP is enabled, the network setting module 303 obtains an IP address by the Auto IP (step S1408). In step S1408, the network setting module 303 carries out a selection process in which it selects in a random manner one IP address from an IP address range prescribed in advance for the Auto IP. The network setting module 303 also carries out a confirmation process in which it confirms that no communication apparatus to which the IP address is set exists on the network of the main line by using the ARP protocol. When a communication apparatus to which the IP address is set exists on the network of the main line, the network setting module 303 repeats the above selection process and the above confirmation process until an IP address which is not used by all communication apparatus on the network of the main lime. The network setting module 303 then decides the address information of the main line of the MFP 101 (step 1409).

For example, when the DHCP is enabled, the network setting module 303 decides the IP address obtained by the searched DHCP server, a subnet mask corresponding to the IP address, and the default gateway as the address information of the main line. When the DHCP is enabled, the obtainment of the IP address from the DHCP server was unsuccessful, and the Auto IP is enabled, or when the DHCP is disabled and the Auto IP is enabled, the network setting module 303 decides that the IP address obtained by the Auto IP, a subnet mask corresponding to the IP address, and the default gateway as the address information of the main line. When the DHCP is enabled, the obtainment of the IP address from the DHCP server was unsuccessful, and the Auto IP is disabled, the network setting module 303 decides a disabled address (0. 0. 0. 0), a subnet mask corresponding to the disabled address, and the default gateway as the address information of the main line. When both of the DHCP and the Auto IP are disabled, the network setting module 303 decides the setting values input to the IP address input section 901, the subnet mask input section 902, and the default gateway input section 903 as the address information of the main line.

The network setting module 303 then carries out an IP address verification process in FIG. 15, to be described later (S1410) to verify the IP address of the decided address information. The network setting module 303 then sets the IP address and the subnet mask of the decided address information to the TCP/IP control module 305 (step S1411). The network setting module 303 then sets the default gateway of the decided address information to the TCP/IP control module 305 (step S1412) and terminates the present process.

FIG. 15 is a flowchart showing a procedure of the IP address verification process in step S1410 in FIG. 14.

In FIG. 15, the network setting module 303 start verification of the IP address of the decided address information (step S1501) and determines whether the IP address is an enabled value (step S1502). In step S1502, when the IP address is the disabled address (0. 0. 0. 0), the network setting module 303 determines that the IP address is not the enabled value. On the other hand, when the IP address is not the disabled address, the network setting module 303 determines that the IP address is the enabled value.

As a result of the determination in step S1502, when the IP address is not the enabled value, the network setting module 303 determines whether the plurality of lines is enabled (step S1503). In step S1503, when the setting value indicative of a plural line mode, specifically, a setting indicative of the "wired (main)+wireless (sub) 803" is stored in the HDD 205, the network setting module 303 determines that the plurality of lines is enabled. On the other hand, when the setting value indicative of a single line mode, specifically, the setting value indicative of either of the "wired-only 801" or "wireless-only 802" is stored in the HDD 205, the network setting module 303 determines that the plurality of lines is not enabled.

As a result of the determination in step S1503, when the plurality of lines is not enabled, the network setting module 303 displays a message 1601 in FIG. 16A prompting the user to check the IP address on the operating unit 113 (step S1504). Accordingly, the user is able to easily grasp that a defects occurs in the IP address set in the single line mode. Thereafter, the network setting module 303 terminates the present process.

As a result of the determination in step S1503, when the plurality of lines is enabled, the network setting module 303 determines whether the IP address is either of an IP address of the main line or an IP address of the sub line (step S1505).

As a result of the determination in step S1505, when the IP address is the IP address of the main line, the network setting module 303 displays a message 1602 in FIG. 16A prompting the user to check the IP address of the main line (step S1506). Accordingly, the user is able to easily grasp that a defect occurs in the IP address set for the main line in the plural line mode. Thereafter, the network setting module 303 terminates the present process.

As a result of the determination in step S1505, when the IP address is the IP address of the sub line, the network setting module 303 displays a message 1603 in FIG. 16A prompting the user to check the IP address of the sub line. Accordingly, the user is able to easily grasp that a defect occurs in the IP address set for the sub line in the plural line mode. Thereafter, the network setting module 303 terminates the present process.

As a result of the determination in step S1502, when the IP address is the enabled value, the network setting module 303 starts an identical IP address confirmation process (step S1508). In the identical IP address confirmation process, it is confirmed that apparatuses to each of which the same IP address is allocated exist on the network which uses IP addresses. The network setting module 303 then determines whether the IP address matches with an IP address of another apparatus on the network which uses IP addresses (step S1509). Specifically, the network setting module 303 uses the ARP protocol to inquire existence of the IP address to the network which uses IP addresses. Upon receiving a reply to the inquiry, the network setting module 303 determines that the another apparatus to which the same IP address is allocated as the IP address exists, that is, the IP address matches with the IP address of the another apparatus. On the other hand, a reply to the inquiry is not received, the network setting module 303 determines that another apparatus to which the same IP address is allocated as the IP address does not exist and the IP address does not match the IP address of the another apparatus.

As a result of the determination in step S1509, when the IP address does not match the IP address of the another apparatus, the network setting module 303 terminates the present process. On the other hand, as a result of the determination in step S1509, when the IP address matches with the IP address of the another apparatus, the network setting module 303 determines whether the plurality of lines is enabled (step S1510).

As a result of the determination in step S1510, when the plurality of lines is not enabled, the network setting module 303 displays a message 1604 in FIG. 16B indicating that the IP address overlaps on the network on the operating unit 113 (step S1511). As a result, the user is able to easily grasp that the IP address set in the single line mode matches with the IP address of the another apparatus. Thereafter, the network setting module 303 terminates the present process.

As a result of the determination in step S1510, when the plurality of lines is enabled, the network setting module 303 determines whether the IP address is either of the IP address of the main line or the IP address of the sub line (step S1512).

As a result of the determination in step S1512, when the IP address is the IP address of the main line, the network setting module 303 displays a message 1605 in FIG. 16B on the operating unit 113 (step S1513). The message 1605 indicates that the IP address of the main line matches with the IP address of the another apparatus on the network. As a result, the user is able to easily grasp that the IP address set for the main line in the plural line mode matches with the IP address of the anther apparatus. Thereafter, the network setting module 303 terminates the present process.

As a result of the determination in step S1512, when the IP address is the IP address of the sub line, the network setting module 303 displays a message 1606 in FIG. 16B on the operating unit 113 (step S1514). The message 1606 indicates that the IP address of the sub line matches with the IP address of the another apparatus on the network. As a result, the user is able to easily grasp that the IP address set for the sub line in the plural line mode matches with the IP address of the anther apparatus. Thereafter, the network setting module 303 terminates the present process.

In the process in FIG. 15 described above, different messages are displayed according to settings on the interface selection screen 800 when an error regarding the IP address of the MFP 101 occurs. Namely, an error message corresponding to a set infrastructure is displayed. Accordingly, the user is able to easily grasp that a defected IP address corresponds to an IP address of which line.

Figure 17:
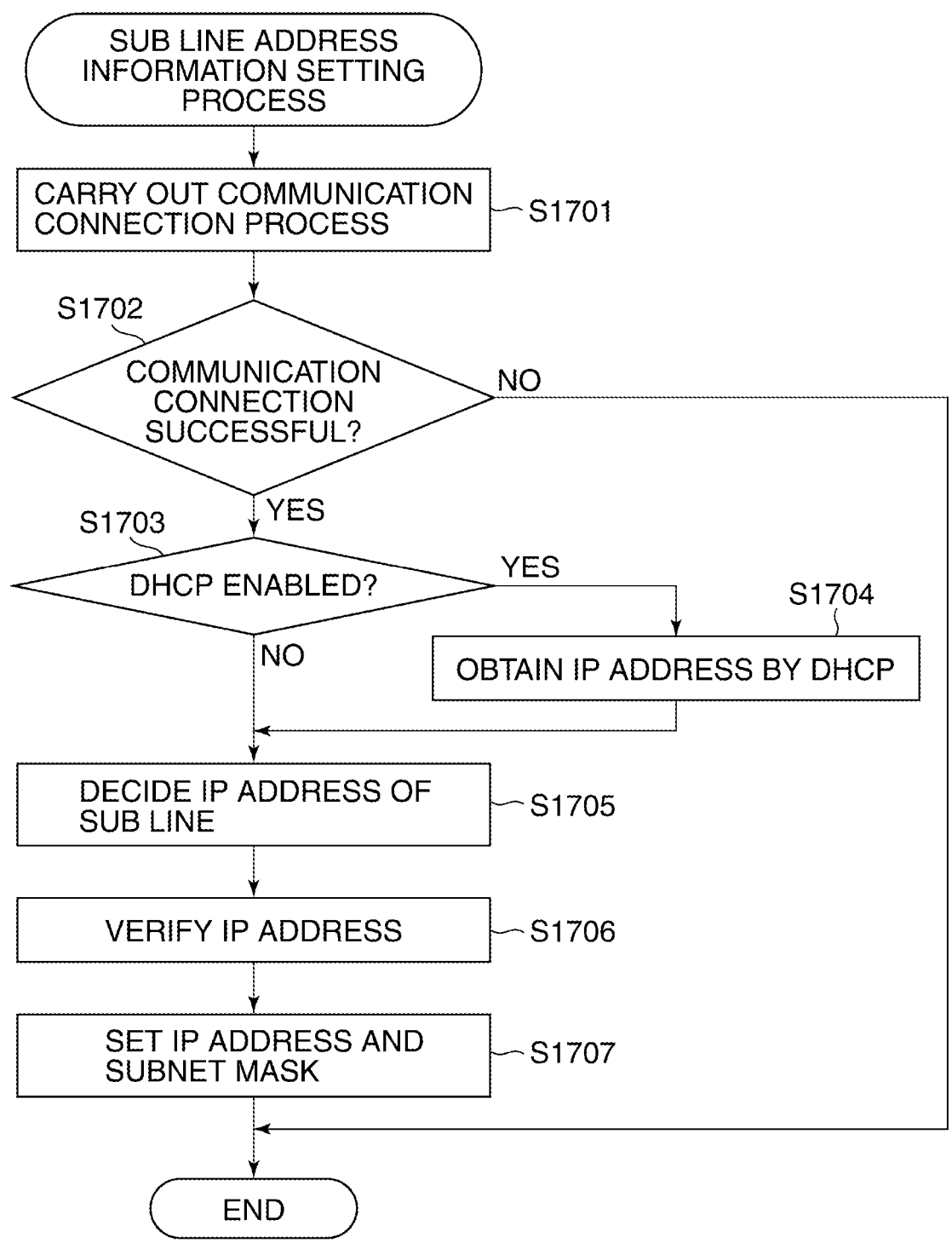
FIG. 17 is a flowchart showing a procedure of a sub line address information setting process carried out by the network setting module appearing in FIG. 3.

FIG. 17 is a flowchart showing a procedure of a sub line address information setting process carried out by the network setting module 303 appearing in FIG. 3.

The process in FIG. 17 is carried out by the CPU 201 implementing a program stored in the HDD 205, and carried out when the setting value indicative of the "wired (main)+wireless (sub) 803" was selected is store in the HDD 205, and the process in FIG. 14 was completed.

In FIG. 17, the network setting module 303 carries out the above described communication connection process with an access point set on the wireless setting screen 1100, for example, the access point 105 (step S1701). The network setting module 303 then determines whether the communication connection with the access point 105 was successful (step S1702).

As a result of the determination in step S1702, when the communication connection with the access point 105 was unsuccessful, the network setting module 303 terminates the present process. On the other hand, as a result of the determination in step S1702, when the communication connection with the access point 105 was successful, the network setting module 303 determines whether the DHCP is enabled based on the setting value set for the DHCP selection section 904 stored in the HDD 205 (step S1703).

As a result of the determination in step S1703, when the DHCP is disabled, the network setting module 303 carries out a process in step S1705, to be described later. On the other hand, as a result of the determination in step S1703, when the DHCP is enabled, the network setting module 303 obtains an IP address by the DHCP (step S1704). The network setting module 303 accesses to the DHCP server on the network of the sub line and obtains the IP address from the DHCP server. The network setting module 303 then decides the address information of the sub line of the MFP 101 (step S1705).

Subsequently, the network setting module 303 carries out the IP address verification process in FIG. 15 (step S1706). The network setting module 303 then sets the IP address and the subnet mask in the decided address information of the sub line to the TCP/IP control module 305 (step S1707) and terminates the present process.

Figure 18:
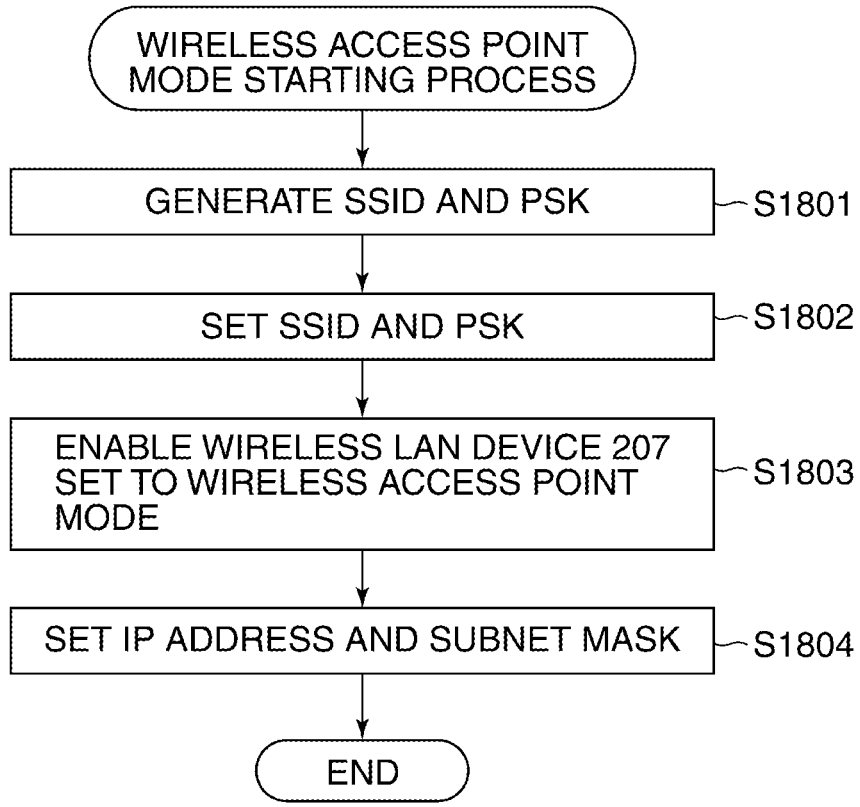
FIG. 18 is a flowchart showing a procedure of a wireless access point mode starting process carried out by the network setting module appearing in FIG. 3.

FIG. 18 is a flowchart showing a procedure of a wireless access point mode starting process carried out by the network setting module 303 appearing in FIG. 3.

The process in FIG. 18 is carried out by the CPU 201 implementing a program stored in the HDD 205, and carried out when the user selects the start button 501 on the start setting screen 500. In the process in FIG. 18, it is assumed that address information for the wireless access point mode, specifically, an IP address and a subnet mask are allocated in advance.

In FIG. 18, the network setting module 303 requests the WPA control module 306 to generate an SSID and a PSK of the MFP 101 as an access point (step S1801). The network setting module 303 then requests the WPA control module 306 to set the SSID and the PSK (step s1802). The network setting module 303 requests the WPA control module 306 to enable the wireless LAN device 207 to which the wireless access point mode is set (step S1803). The network setting module 303 then sets address information for the wireless access point mode. Specifically, the network setting module 303 sets an IP address and a subnet mask in the address information for the wireless access point mode to the TCP/IP control module 305 (step S1804). Accordingly, the MPF 101 is able to perform the Wireless Direct. Subsequently, the network setting module 303 terminates the present process.

Figure 19:
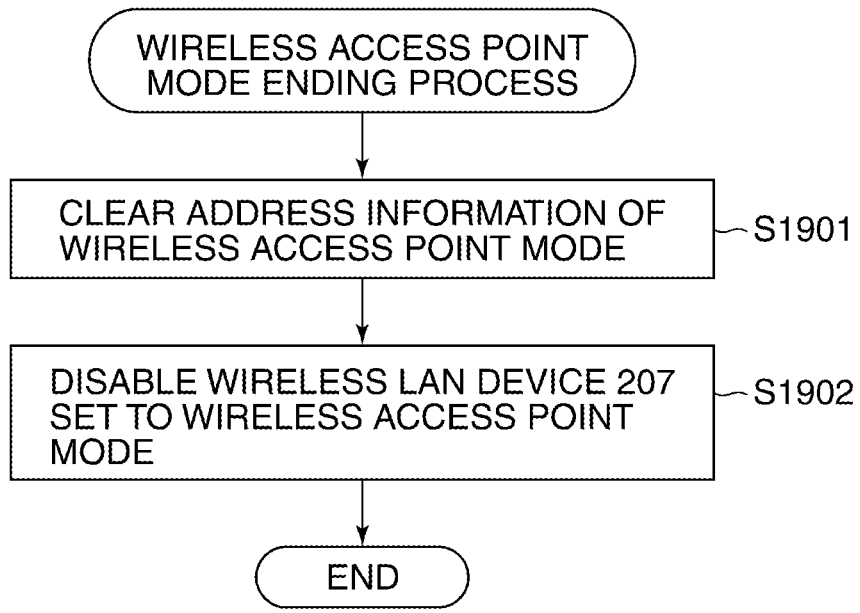
FIG. 19 is a flowchart showing a procedure of a wireless access point mode ending process carried out by the network setting module appearing in FIG. 3.

FIG. 19 is a flowchart showing a procedure of a wireless access point mode ending process carried out by the network setting module 303 appearing in FIG. 3.

The process in FIG. 19 is carried out by the CPU 201 implementing a program stored in the HDD 205. The process in FIG. 19 is also carried out when the user selects the end button 503 on the setting information screen 502 while the MFP 101 is in the wireless access point mode.

In FIG. 19, the network setting module 303 clears address information of the set wireless access point mode, specifically, the IP address and the subnet mask for the wireless access point mode (step S1901). The network setting module 303 then requests the WPA control module 306 to disable the wireless LAN device 207 set to the wireless access point mode (step S1902). Subsequently, the network setting module 303 terminates the present process.

It should be noted that in the present embodiment described above, a name of the main line may be replaced with a name such as a primary line and a priority line, and a name of the sub line may be replaced with a name such as a secondary line and an auxiliary line.

Moreover, in the present embodiment described above, a name of the line may be replaced with a name such as an infrastructure.

Furthermore, in the present embodiment described above, a configuration which realizes a plurality of lines by using a physically different plurality of network interfaces was explained. However, a configuration which realizes a plurality of logical lines by using a single network interface may be applied to the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-137594, filed Jul. 14, 2017, which is hereby incorporated by reference herein in its entirety.

What is claimed is:

1. An information processing apparatus that is capable of receiving data using a plurality of communication interfaces and is configured to execute a job based on the received data, the information processing apparatus comprising:
   at least one memory that stores instructions; and
   at least one processor that executes the instructions, the instructions, when executed, causing the information processing apparatus to:
   set a communication interface from among the plurality of communication interfaces to be enabled in accordance with a user operation; and
   display, in a state where multiple communication interfaces are set as enabled and in a case where an error that an IP address assigned to at least any one communication interface out of the enabled multiple communication interfaces overlaps with an IP address of an external apparatus on a network to which the one communication interface connects occurs, a character string that associates information regarding the error and information identifying the one communication interface having the overlapping IP address on a first display area such that:
  in a first case where a first error occurs, the first error occurring when an IP address of a main communication interface overlaps with an IP address of an external apparatus on a network to which the main communication interface connects, a first character string that associates (i) information indicating a content of the first error that the IP address of the main communication interface overlaps with the IP address of the external apparatus on the network to which the main communication interface connects and (ii) information identifying the main communication interface is displayed on the first display area, and
  in a second case where a second error occurs, the second error occurring when an IP address of a sub communication interface, which is different from the main communication interface, overlaps with an IP address of an external apparatus on a network to which the sub communication interface connects, a second character string that associates (iii) information indicating a content of the second error that the IP address of the sub communication interface overlaps with the IP address of the external apparatus on the network to which the sub communication interface connects and (iv) information identifying the sub communication interface is displayed on the first display area,
wherein the first character string displayed on the first display area excludes a character string identifying a communication interface other than the main communication interface, and the second character string displayed on the first display area excludes a character string identifying a communication interface other than the sub communication interface.

2. The information processing apparatus according to claim 1,
  wherein the instructions, when executed, further cause the information processing apparatus to (i) display a display object for setting a default gateway on a first setting screen corresponding to the main communication interface and (ii) not display the display object for setting the default gateway on a second setting screen corresponding to the sub communication interface.

3. The information processing apparatus according to claim 1, wherein:
  the plurality of communication interfaces include a wired interface and a wireless interface,
  the instructions, when executed, further cause the information processing apparatus to display a setting screen for prompting a user to select any one of three choices consisting of a first choice which enables the wired interface without enabling the wireless interface, a second choice which enables the wireless interface without enabling the wired interface, and a third choice which enables both the wired interface and the wireless interface, and
  at least one communication interface to be enabled is set in accordance with a selection by the user on the setting screen.

4. The information processing apparatus according to claim 1, wherein the information processing apparatus is a printing apparatus.

5. The information processing apparatus according to claim 1, wherein a determination of whether or not the first error or the second error occurs is performed using an ARP protocol, and
  the determination is performed in a case of receiving a user operation to apply a change of interface setting or in a case where the information processing apparatus shifts from a power-off state to a power-on state.

6. The information processing apparatus according to claim 1, wherein the instructions, when executed, further cause the information processing apparatus to:
  display, in a state where only one communication interface out of the plurality of communication interfaces is set as enabled and in a case where an error regarding the enabled one communication interface occurs, in the first display area, information indicating contents of the occurring error without displaying information for identifying the one communication interface in which the error occurs.

7. The information processing apparatus according to claim 1, wherein the first display area is provided for displaying a status of the information processing apparatus.

8. A control method for an information processing apparatus that is capable of receiving data using a plurality of communication interfaces and is configured to execute a job based on the received data, the control method comprising:
  setting a communication interface from among the plurality of communication interfaces to be enabled in accordance with a user operation; and
  displaying, in a state where multiple communication interfaces are set as enabled and in a case where an error that an IP address assigned to at least any one communication interface out of the enabled multiple communication interfaces overlaps with an IP address of an external apparatus on a network to which the one communication interface connects occurs, a character string that associates information regarding the error and information identifying the one communication interface having the overlapping IP address on a first display area such that:
    in a first case where a first error occurs, the first error occurring when an IP address of a main communication interface overlaps with an IP address of an external apparatus on a network to which the main communication interface connects, a first character string that associates (i) information indicating a content of the first error that the IP address of the main communication interface overlaps with the IP address of the external apparatus on the network to which the main communication interface connects and (ii) information identifying the main communication interface is displayed on the first display area, and
    in a second case where a second error occurs, the second error occurring when an IP address of a sub communication interface, which is different from the main communication interface, overlaps with an IP address of an external apparatus on a network to which the sub communication interface connects, a second character string that associates (iii) information indicating a content of the second error that the IP address of the sub communication interface overlaps with the IP address of the external apparatus on the network to which the sub communication interface connects and (iv) information identifying the sub communication interface is displayed on the first display area, wherein the first character string displayed on the first display area excludes a character string identifying a communication interface other than the main communication interface, and the second character string displayed on the first display area excludes a character string identifying a communication interface other than the sub communication interface.

9. A non-transitory computer-readable storage medium storing a program for causing a computer to execute a control method for an information processing apparatus that is capable of receiving data using a plurality of communication interfaces and is configured to execute a job based on the received data, the control method comprising:

setting a communication interface from among the plurality of communication interfaces to be enabled in accordance with a user operation; and displaying, in a state where multiple communication interfaces are set as enabled and in a case where an error that an IP address assigned to at least any one communication interface out of the enabled multiple communication interfaces overlaps with an IP address of an external apparatus on a network to which the one communication interface connects occurs, a character string that associates information regarding the error and information identifying the one communication interface having the overlapping IP address on a first display area such that:

in a first case where a first error occurs, the first error occurring when an IP address of a main communication interface overlaps with an IP address of an external apparatus on a network to which the main communication interface connects, a first character string that associates (i) information indicating a content of the first error that the IP address of the main communication interface overlaps with the IP address of the external apparatus on the network to which the main communication interface connects and (ii) information identifying the main communication interface is displayed on the first display area, and in a second case where a second error occurs, the second error occurring when an IP address of a sub communication interface, which is different from the main communication interface, overlaps with an IP address of an external apparatus on a network to which the sub communication interface connects, a second character string that associates (iii) information indicating a content of the second error that the IP address of the sub communication interface overlaps with the IP address of the external apparatus on the network to which the sub communication interface connects and (iv) information identifying the sub communication interface is displayed on the first display area, wherein the first character string displayed on the first display area excludes a character string identifying a communication interface other than the main communication interface, and the second character string displayed on the first display area excludes a character string identifying a communication interface other than the sub communication interface.

* * * * *